US012711595B2

(12) United States Patent
Booth et al.

(10) Patent No.: US 12,711,595 B2
(45) Date of Patent: Aug. 18, 2026

(54) DETERMINING OPTICAL ABERRATION

(71) Applicant: Oxford University Innovation Limited, Oxford (GB)

(72) Inventors: Martin Booth, Oxford (GB); Qi Hu, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 216 days.

(21) Appl. No.: 18/728,488

(22) PCT Filed: Jan. 23, 2023

(86) PCT No.: PCT/GB2023/050146
§ 371 (c)(1),
(2) Date: Jul. 12, 2024

(87) PCT Pub. No.: WO2023/144519
PCT Pub. Date: Aug. 3, 2023

(65) Prior Publication Data

US 2025/0111490 A1 Apr. 3, 2025

(30) Foreign Application Priority Data

Jan. 25, 2022 (GB) ...................................... 2200966

(51) Int. Cl.
*G06T 7/00* (2017.01)
*G02B 27/00* (2006.01)

(52) U.S. Cl.
CPC ........ *G06T 7/0002* (2013.01); *G02B 27/0068* (2013.01); *G06T 2207/10056* (2013.01); (Continued)

(58) Field of Classification Search
CPC ........ G02B 27/0025–0068; G06T 2207/10056
See application file for complete search history.

(56) References Cited

U.S. PATENT DOCUMENTS

2020/0284649 A1 9/2020 Baudat

FOREIGN PATENT DOCUMENTS

CN 111 008 945 A 4/2020
WO 2018/102302 A1 6/2018

OTHER PUBLICATIONS

Serafimovich, Pavel, Alexey Dzyuba, and Sergey Popov. “Using classifier-regressor pipeline in the problem of recognizing wavefront aberrations.” 2021 International Conference on Information Technology and Nanotechnology (ITNT). IEEE, 2021. (Year: 2021).*

(Continued)

*Primary Examiner* — Raphael Schwartz
(74) *Attorney, Agent, or Firm* — Thomas|Horstemeyer, LLP

(57) ABSTRACT

A method of determining aberration in an optical system comprising an adaptive optical element is provided. The method comprises obtaining a first image in which the adaptive optical element is in a first configuration. The method comprises obtaining a second image in which the adaptive optical element is in a second configuration, wherein the second configuration is different from the first configuration. The method comprises applying a transform to the first image and the second image to produce a transformed first image and a transformed second image. The method comprises obtaining a ratio comprising the transformed first image and the transformed second image and determining a pseudo-PSF from the ratio. The method comprises providing data sampled from the pseudo-PSF to a machine learning algorithm that has been trained to determine an output indicative of aberration coefficients from the data.

20 Claims, 5 Drawing Sheets

(52) U.S. Cl.
CPC .............. *G06T 2207/20056* (2013.01); *G06T 2207/20064* (2013.01); *G06T 2207/20081* (2013.01); *G06T 2207/30168* (2013.01)

(56) References Cited

OTHER PUBLICATIONS

Hu, Shuwen, et al. "Deep learning based wavefront sensor for complex wavefront detection in adaptive optical microscopes." Frontiers of Information Technology & Electronic Engineering 22.10 (2021): 1277-1288. (Year: 2021).*

Hu, Qi., et al. "A universal framework for microscope sensorless adaptive optics: Generalized aberration representations." APL Photonics 5.10 (2020). (Year: 2020).*

International Search Report and Written Opinion for WO 2023/144519 (PCT/GB2023/050146), dated May 4, 2023, pp. 1-12.

UK Search Report for GB 2200966.6, dated Jul. 18, 2022, 1 page.

Hu Showen et al: "Deep learning based wavefront sensor for complex wavefront detection in adaptive optical microscopes", Frontiers of Information Technology & Electronic Engineering, Zhejiang University Press, Heidelberg, vol. 22, No. 10, Mar. 29, 2021 (Mar. 29, 2021), pp. 1277-1288.

Serafimovich Pavel et al: "Using classifier-regressor pipeline in the problem of recognizing wavefront aberrations", 2021 International Conference on Information Technology and Nanotechnology (ITNT), IEEE, Sep. 20, 2021 (Sep. 20, 2021), pp. 1-5.

Cumming Benjamin P et al: "High Numerical Aperture Aberration Compensation Enabled by an Artificial Neural Network", 2019 Conference on Lasers and Electro-Optics Europe & European Quantum Electronics Conference (CLEO/Europe—EQEC), IEEE, Jun. 23, 2019 (Jun. 23, 2019), p. 1.

K. Hu et al. "Build the Structure ofWFSless AO System Through Deep Reinforcement Learning", K. Hu et al., IEE Phot Tech Lett 30 (23) (2018).

* cited by examiner

Flat wavefront

Adaptive element

Complex wavefront

Lens

Multiple foci

DETERMINING OPTICAL ABERRATION

CROSS-REFERENCE TO RELATED APPLICATIONS

This application is the National Stage of International Application No. PCT/GB2023/050146, filed Jan. 23, 2023, which claims priority to GB 2200966.6, filed Jan. 25, 2022, which are entirely incorporated herein by reference.

TECHNICAL FIELD

The present invention relates to determining aberration in an optical system comprising an adaptive optical element.

BACKGROUND

Aberrations in optical images are introduced by imperfections in an imaging system (for example, a microscope) and by inhomogeneous refractive index of imaged objects. Aberrations are distortions of the optical wavefront that affect image quality by reducing signal level, contrast and resolution.

Adaptive optics uses reconfigurable or adaptive optical elements, such as spatial light modulators (SLM), deformable mirrors (DM) and deformable refractive devices to compensate or correct aberrations introduced by the optical system or specimen.

Conventional approaches to adaptive optics include sensor-based and sensorless adaptive optics.

In sensor-based adaptive optics, a wavefront sensor, such as a Shack-Hartman sensor, is used to measure wavefront aberrations. A control system may then use the measurement to correct the aberrations using an adaptive optical element.

In sensorless adaptive optics, aberrations are instead estimated indirectly. A sequence of images is obtained, each with a different test aberration (bias) intentionally applied via the adaptive optical element. The intentional aberration exists in addition to the unknown aberration already present in the optical system. A value or metric related to the image quality (for example, total image intensity, contrast, sharpness, spatial frequency content, resolution etc.) is then calculated directly from each image and the collection of values input to an optimisation algorithm to estimate the unknown aberration. The estimate is used to control an adaptive optical element to apply an aberration equal but opposite to the estimated aberration, thus cancelling the inherent aberration in the optical system and optimising image quality.

Sensorless adaptive optics has been widely applied in a range of optical imaging systems (including microscope) using different bias aberrations and image quality metrics. However, all existing conventional variations of sensorless adaptive optics require multiple exposures or images in practice. For example, using a parabolic fitting metric optimisation algorithm to estimate aberrations, a total of at least 2N+1 measurements or images is required to correct for N modes if a common measurement with zero bias aberration is shared among all the N modal predictions. If the N modes are corrected one at a time, at least 3N measurements are required.

The present invention has been devised with the foregoing in mind.

SUMMARY

According to a first aspect, there is provided a method of determining aberration in an optical system, the optical system comprising an adaptive optical element. The method may comprise obtaining a first image in which the adaptive optical element is in a first configuration. The method may further comprise a second image in which the adaptive optical element is in a second configuration. The second configuration may be different from the first configuration. The method may further comprise applying a transform to the first image and the second image to produce a transformed first image and a transformed second image. The method may also comprise obtaining a ratio comprising the transformed first image and the transformed second image and determining a pseudo-PSF from the ratio. The method may further comprise providing data sampled from the pseudo-PSF to a machine learning algorithm that has been trained to determine an output indicative of aberration coefficients from the data. The method may be a computer-implemented method.

In the first configuration the adaptive optical element may be configured to introduce a first phase aberration comprising at least one non-zero Zernike polynomial coefficient with a Noll index greater than 4. In the second configuration the adaptive optical element may be configured to introduce a second phase aberration. The second phase aberration may be different from the first phase aberration.

Many conventional phase diversity techniques use defocussed images to retrieve phase information from an intensity image. That is due to the practical ease with which an object, a camera, or a lens can be displaced to acquire defocussed images. In many conventional applications the object can be considered as a two-dimensional object, as even a three-dimensional object at a large distance from the lens can be considered two-dimensional in practice, if its extent along the optical axis is comparable to the depth of focus of the imaging system. In such cases, introducing defocus simply causes a blurring of the image.

However, in many high-resolution microscope applications (for example, used to image biological structures), objects are three-dimensional and extend beyond the depth of focus of the imaging system. Applying a defocus phase aberration therefore moves the focus of the microscope to a different specimen plane, bringing different specimen structures into focus.

That complicates the use of defocus phase aberrations to determine aberrations of optical systems such as high-resolution microscope.

Applying a different bias phase aberration comprising at least one non-zero Zernike polynomial coefficient with a Noll index greater than 4, using an adaptive optical element, may therefore avoid refocussing problems associated with using defocus phase aberrations.

The first phase aberration comprising at least one non-zero Zernike polynomial coefficient with a Noll index greater than 4 may be physically interpreted as a phase aberration comprising an aberration mode other than piston, tip, tilt and defocus (which respectively correspond to Noll indexes of 1, 2, 3 and 4). The first phase aberration may therefore alternatively be represented or expressed in equivalent form using a different aberration mode decomposition. For example, the first phase aberration may be represented or expressed using deformable mirror modes, Walsh modes, polar Walsh modes, Fourier modes etc. The first phase aberration may comprise an aberration which can be represented using at least one non-zero Zernike polynomial coefficient with a Noll index greater than 4.

The first phase aberration may comprise astigmatism. That may provide a significant improvement in determination and compensation or correction of aberration in an optical system in comparison to applying conventional defocus phase aberration.

Determining the pseudo-PSF may comprise applying the inverse of the transform to determine a pseudo-PSF image from the ratio.

The second phase aberration may be zero. Alternatively, the second phase aberration may be an aberration having opposite polarity or amplitude to the first phase aberration.

The transform may comprise the property that a convolution in the image domain is transformed to a multiplication in the transformed domain. The transform may be one of a Fourier transform, a Fourier cosine transform, a Fourier sine transform or a wavelet transform.

Obtaining the ratio may comprise obtaining a first ratio of the transformed first image to the transformed second image and obtaining a second ratio of the transformed second image to the transformed first image. Determining the pseudo-PSF may comprise determining a first pseudo-PSF from the first ratio and determining a second pseudo-PSF from the second ratio.

Obtaining the first image may comprise obtaining a plurality of first images in each of which the adaptive optical element is configured to introduce a different first phase aberration comprising at least one non-zero Zernike polynomial coefficient with a Noll index greater than 4. Obtaining the second image may comprise obtaining a plurality of second images.

Each first image may be paired with a respective second image. The method may comprise applying a transform to each first image and each second image to obtain transformed first images and transformed second images. The method may comprise obtaining a ratio for each respective pair of transformed first and second images, and determining a pseudo-PSF from each ratio. The method may comprise providing data samples from each pseudo-PSF to the machine learning algorithm.

Obtaining the first image may comprise obtaining a first image in which the adaptive optical element is configured to introduce a plurality of first phase aberrations, at least one of the first phase aberrations comprising at least one non-zero Zernike polynomial coefficient with a Noll index greater than 4. Obtaining the second image may comprise obtaining a second image in which the adaptive optical element is configured to introduce a plurality of second phase aberrations different from the plurality of first phase aberrations.

In the first configuration the adaptive optical element may be configured to generate a first plurality of focal spots having a first arrangement. In the second configuration the adaptive optical element may be configured to generate a second plurality of focal spots having a second arrangement. The second arrangement of focal spots may be different from the first arrangement of focal spots. The second arrangement of focal spots may be or comprise a spatial inversion of the first arrangement of focal spots. The first arrangement of focal spots and the second arrangement of focal spots may comprise a 2D or a 3D arrangement of focal spots. The focal spots may be spaced apart from one another by a distance of the order of a width of the focal spots.

At least one of the focal spots may introduce a phase aberration. Each of a plurality of the focal spots may introduce a different phase aberration.

The adaptive optical element may be configured to generate a plurality of focal spots to introduce each of the plurality of first phase aberrations and the plurality of second phase aberrations. The plurality of focal spots in the arrangement may introduce a plurality of different phase aberrations, for example each focal spot in the arrangement may introduce a different phase aberration.

Obtaining the first image may comprise obtaining a plurality of first images simultaneously. Obtaining the second image may comprise obtaining a plurality of second images simultaneously. Each first image may be paired with a respective second image. The method may comprise applying a transform to each first image and each second image to obtain transformed first images and transformed second images. The method may comprise obtaining a ratio for each respective pair of transformed first and second images and determining a pseudo-PSF from each ratio. The method may comprise providing data samples from each pseudo-PSF to the machine learning algorithm.

The plurality of first images may be obtained simultaneously and/or the plurality of second images may be obtained simultaneously using a plurality of detectors (for example, photodetectors) located at different spatial locations or positions. For example, the plurality of detectors may be located at different lateral X-Y positions, and/or at different Z positions or focal planes.

The method may further comprise controlling the adaptive optical element based on the output from the machine learning algorithm to compensate or correct aberration in the optical system.

Deconvolution is a post-image processing technique which seeks to restore the equivalent of an aberration free image. Deconvolution is used in many conventional phase diversity techniques which make use of defocussed images. However, deconvolution is only an effective process for images where the signal-to-noise (SNR) ratio is sufficiently high. In lower SNR scenarios, which are often encountered in high-resolution microscopy, there is insufficient useful information in the raw images to permit effective deconvolution.

Adaptive optical correction of aberrations may enable the acquisition of higher SNR image data, which might then be employed more effectively in a deconvolution process. Furthermore, the presence of aberrations can cause loss of image information because aberrations can cause low or zero values in the optical transfer function of an imaging system. That may lead to information loss that cannot be recovered through any computational process but can be retrieved through adaptive optical aberration correction. Additionally or alternatively, the images may be deconvolved with the pseudo-PSF(s) determined from the ratio of the transformed first and second images in combination with the determined output indicative of the aberration coefficients. A combination of aberration correction (by controlling the adaptive optical element) and deconvolution based on the determined output indicative of the aberration coefficients may be used.

In addition, the inherent nature of post-image processing such as deconvolution is there is no verification after the process. It is often observed that post-image processing can add spurious artifacts which inevitably compromise data integrity. In comparison, using adaptive optical aberration correction may enable changes in the signal to be detected and serve as a form of monitoring or verification. That may be particularly beneficial in scientific research applications where data integrity is critical.

The method may further comprise, after controlling the adaptive optical element to compensate or correct aberration in the optical system, repeating the steps of obtaining first and second images, applying a transform to produce transformed first and second images, obtaining a ratio from the transformed first and second images and determining a pseudo-PSF from the ratio, and providing data sampled from the pseudo-PSF to the machine learning algorithm.

That may enable iterative improvement in aberration compensation and correction. That may not be possible in post-image processing techniques such as deconvolution without compromising data integrity, as described above.

The machine learning algorithm may comprise a series of convolution layers. Each convolution layer may be connected to a pooling operation. An output of each of the pooling operations may be provided to a fully connected layer.

That may enable the machine learning algorithm to converge to a suitable level of complexity and avoid overfitting. That may also enable the weights of the machine learning algorithm to indicate whether aberration effects on smaller or larger scale image features contain more important information relating to aberrations.

The output of each of the pooling operations may be directly provided to the fully connected layer. The output of each of the pooling operations may be provided to the fully connected layer without being provided to subsequent convolution layers in the series.

That may enable the machine learning algorithm to be smaller, with fewer trainable kernels and/or nodes, than conventional networks used to compute phase aberrations from images. That may increase ease of network convergence and reduce computational requirements for both training and operation.

Each of the pooling operations may be a global maxpooling operation.

According to a second aspect, there is provided a system. The system may provide an optical system comprising an adaptive optical element. The system may further comprise a processor operably connected to the optical system. The processor may be configured to control the optical system to obtain a first image in which the adaptive optical element is configured to introduce a first phase aberration. The first phase aberration may comprise at least one non-zero Zernike polynomial coefficient with a Noll index greater than 4. The processor may also be configured to control the optical system to obtain a second image in which the adaptive optical element is configured to introduce a second phase aberration. The second phase aberration may be different from the first phase aberration. The processor may be configured to apply a transform to the first image and the second image to produce a transformed first image and a transformed second image. The processor may be configured to obtain a ratio comprising the transformed first image and the transformed second image. The processor may be configured to determine a pseudo-PSF from the ratio. The processor may comprise a machine learning algorithm that has been trained to determine an output indicative of aberration coefficients from data sampled from the pseudo-PSF. The processor may be configured to provide data sampled from the pseudo-PSF to the machine learning algorithm.

The processor of the second aspect may be configured to perform the method of the first aspect.

According to a third aspect, there is provided a non-transitory computer program comprising instructions which, when executed by a processor, cause the processor to carry out the method of the first aspect.

According to a fourth aspect, there is provided a computer-readable medium having the computer program of the third aspect stored thereon.

According to a fifth aspect, there is provided a method of determining aberration in an optical system, the optical system comprising an adaptive optical element. The method may comprise obtaining a first image in which the adaptive optical element is configured to introduce a first phase aberration. The method may further comprise a second image in which the adaptive optical element is configured to introduce a second phase aberration. The second phase aberration may be different from the first phase aberration. The method may further comprise applying a transform to the first image and the second image to produce a transformed first image and a transformed second image. The method may also comprise obtaining a ratio comprising the transformed first image and the transformed second image and determining a pseudo-PSF from the ratio. The method may further comprise providing data sampled from the pseudo-PSF to a machine learning algorithm that has been trained to determine an output indicative of aberration coefficients from the data. The machine learning algorithm may comprise a series of convolution layers, each connected to a pooling operation. An output of each of the pooling operations is provided to a fully connected layer. The method may be a computer-implemented method.

The output of each of the pooling operations may be directly provided to the fully connected layer. The output of each of the pooling operations may be provided to the fully connected layer without being provided to subsequent convolution layers in the series.

Each of the pooling operations may be a global maxpooling operation.

The method of the fifth aspect may comprise one or more optional features of the first aspect.

According to a sixth aspect, there is provided a method of determining aberration in an optical system, the optical system comprising an adaptive optical element. The method may comprise obtaining a first image in which the adaptive optical element is configured to introduce a first phase aberration. The method may further comprise a second image in which the adaptive optical element is configured to introduce a second phase aberration. The second phase aberration may be different from the first phase aberration. The method may further comprise applying a transform to the first image and the second image to produce a transformed first image and a transformed second image. The method may also comprise obtaining a ratio comprising the transformed first image and the transformed second image and determining a pseudo-PSF from the ratio. The method may further comprise providing data sampled from the pseudo-PSF to a machine learning algorithm that has been trained to determine an output indicative of aberration coefficients from the data. The method may be a computer-implemented method.

The method may further comprise controlling the adaptive optical element based on the output from the machine learning algorithm to compensate or correct aberration in the optical system.

The method may further comprise, after controlling the adaptive optical element to compensate or correct aberration in the optical system, repeating the steps of obtaining first and second images, applying a transform to produce transformed first and second images, obtaining a ratio from the transformed first and second images and determining a pseudo-PSF from the ratio, and providing data sampled from the pseudo-PSF to the machine learning algorithm.

The method of the sixth aspect may comprise one or more optional features from either or both the method of the first aspect and the method of the fifth aspect.

Features which are described in the context of separate aspects and embodiments of the invention may be used together and/or be interchangeable wherever possible. Similarly, where features are described in the context of a single embodiment for brevity, those features may also be provided separately or in any sub-combination. Features described in connection with the method of the first aspect may have corresponding features definable with respect to the system of the second aspect and the methods of the fifth and sixth aspects, and vice versa, and those embodiments are specifically envisaged.

BRIEF DESCRIPTION OF THE DRAWINGS

The invention will now be described, by way of example only, with reference to the accompanying drawings in which.

Like reference numbers and designations in the various drawings may indicate like elements.

DETAILED DESCRIPTION

Figure 1:
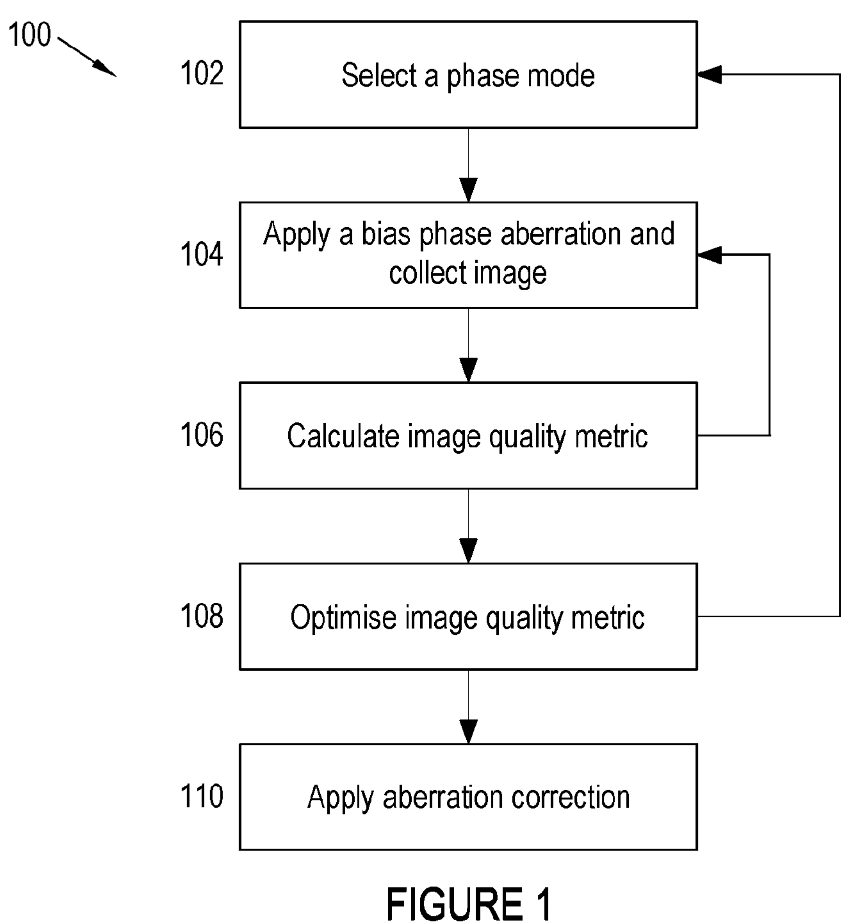
FIG. 1 shows a conventional method of determining aberration in an optical system using adaptive optics.

FIG. 1 shows a conventional method 100 of determining aberration in an optical system using adaptive optics. Step 102 of the method 100 comprises selecting a phase mode. Step 104 of the method 100 comprises applying a bias phase aberration for the selected phase mode using an adaptive optical element, and collecting a first image. Step 104 of the method 100 is repeated at least once with a different perturbation or bias phase aberration for the selected phase mode to obtain a series of images.

The only measurement available to a sensorless adaptive optics imaging system is the image, which contains an ordered collection of intensity measurements from the imaging plane. Image formation can be mathematically expressed as a convolution between a structure of the object being imaged and the point spread function (PSF) of the imaging system. Using a widefield single-photon fluorescence microscope as an example, the image output of the microscope is a fluorescence intensity distribution which is mathematically expressed as a convolution between the PSF of the system and the fluorophore density of the sample. Since the effects of the phase aberration introduced by the imaging system are confined to the PSF of the imaging system, and normally sample or object structures are unknown at least to some degree, more than one measurement is commonly required to deduce the PSF unambiguously from image data. The typical signal-to-noise ratio (SNR) in imaging systems such as microscopes makes retrieval of phase even more challenging.

Therefore, conventional variations of sensorless adaptive optics require multiple exposures in practice. Each of these exposures is obtained with a different perturbation to the imaging system in the form of a bias phase aberration introduced by an adaptive optical element, for example a deformable mirror (DM) or spatial light modulator (SLM).

The applied bias phase aberrations can be classified as 'model" and 'zonal'. 'Modal' refers to wavefront shapes across the entire pupil, while 'zonal' refers to a pupil split up into a plurality of zones for which the wavefront deformation is carried out in one zone at a time.

Common aberration decompositions used in 'modal' methods include Zernike polynomials and deformable mirror modes. In 'zonal' methods, within each zone one could apply i) piston only (a constant phase shift over the zone), ii) piston, tip and tilt (constant phase shift plus phase gradients) or iii) other higher order modes. Adaptive optics approaches normally apply an amount of one aberration 'mode' (either across the whole pupil or over a zone) as the imaging system perturbation.

Using a SLM to apply bias phase aberrations is typically more straightforward because an SLM normally has more pixels across the pupil, with highly localised phase modulation. In comparison, a DM is relatively more complicated since a DM typically has fewer actuators, and actuators may have non-localised effects across the mirror surface. To display phase aberrations on a DM, DM calibration needs to be carried out to convert mode coefficients to actuator control signals. That can be done with a wavefront sensor (such as a Shack-Hartman sensor or interferometer) or via indirect optimisation. The conversion between aberration coefficients and control signals is usually performed using linear algebra, through a matrix multiplication or another form of optimisation.

Step 106 of the method 100 comprises calculating an image quality metric for each image of the series of images collected at step 104 for the selected phase mode. Step 108 of the method 100 comprises optimising the image quality metric to determine estimated aberration coefficients. Steps 102 to 108 are repeated for each of a plurality of different phase modes.

The image quality metric calculated for each image quantifies the quality of each recorded image. Suitable image quality metrics include total image intensity (sum of pixel values), contrast, sharpness, spatial frequency content, resolution etc. Combinations of two or more image quality metrics may also be used. Multi-dimensional image quality metrics (such as a multi-scale wavelet decomposition based metric) may alternatively be used, for example in image systems where image quality needs to be quantified in a more flexible way and where single-dimensional image quality metrics may be misleading.

Since only an aberration free pupil phase can result in a diffraction limited performance of the imaging system, optimising the image quality metric allows the aberration coefficients (and by extension, a required phase aberration correction to the pupil plane) to be inferred. The image quality metric optimisation process may deduce the optimal coefficients of each selected phase mode, to minimise aberrations introduced during the imaging process.

Figure 2:
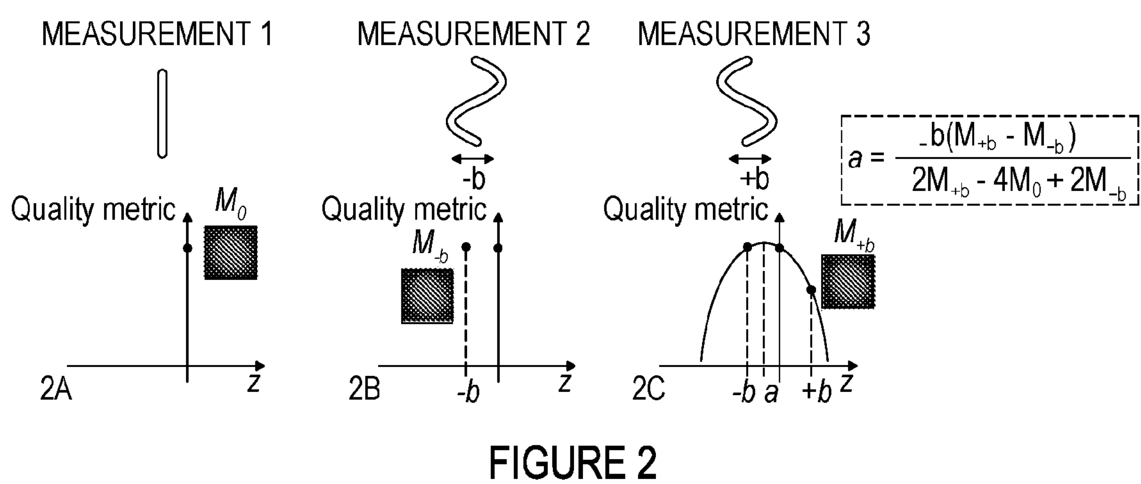
FIGS. 2A to 2C show conventional parabolic fitting of an aberration mode.

Conventional metric optimisation algorithms used in sensorless adaptive optics include stochastic search, parabolic fitting, Gaussian fitting, IMPACT, pupil segmentation and F-sharp. An example of parabolic fitting metric optimisation for a single aberration mode is shown in FIG. 2. In parabolic fitting, the image quality metric M variation as a function of the coefficient of each mode or elemental mode is approximated as a parabola. Therefore, at least three measurements, each taken using a different known bias phase aberration z for a selected phase mode (for example, z=+b, z=−b, z=0), are required to deduce each coefficient as shown in FIGS. 2A to 2C. For correcting a total of N modes, at least 2N+1 measurements are required, if a common measurement with zero bias aberration (as shown in FIG. 2A) is shared among each of the N modal predications. If the aberration modes are corrected one at a time, at least 3N measurements are required since each prediction or estimation requires three measurements.

Step 110 of the method 100 comprises apply an aberration using the adaptive optical element to compensate or correct inherent aberration in the imaging system. The applied aberration is an equal but opposite aberration to the estimated aberration.

Figures 3, 3A:
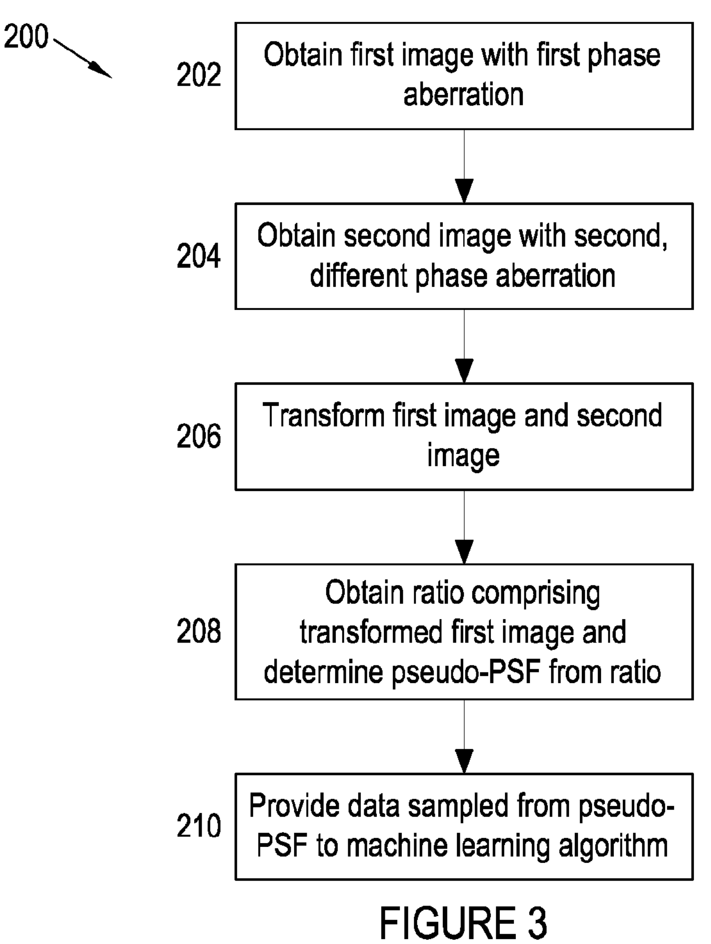
FIG. 3 shows a method of determining aberration in an optical system comprising an adaptive optical element, in accordance with an embodiment of the invention.
FIG. 3A shows a method for generating a plurality of focal spots.

FIG. 3 shows a method 200 of determining aberration in an optical system comprising an adaptive optical element (such as a microscope), in accordance with an embodiment of the invention. The adaptive optical element is configured to introduce a spatial variation in a property of the light (for example, phase, intensity, polarisation etc.).

Step 202 of the method 200 comprises obtaining a first image in which the adaptive optical element is configured to introduce a first phase aberration. In the embodiment shown, the first phase aberration comprises at least one non-zero Zernike polynomial coefficient with a Noll index greater than 4. The first phase aberration may be or comprise astigmatism (such as oblique astigmatism or vertical astigmatism), or a different phase aberration mode such as coma (such as vertical coma or horizontal coma), trefoil, spherical etc. The first phase aberration may also be referred to as a first bias phase aberration.

Table 1 below shows a plurality of aberration modes and their respective Noll indexes j up to j=13.

The first phase aberration comprising at least one non-zero Zernike polynomial coefficient with a Noll index greater than 4 is physically interpreted as a phase aberration comprising an aberration mode other than piston, tip, tilt and defocus (which respectively correspond to Noll indexes of 1, 2, 3 and 4). However, it will be appreciated the first phase aberration may alternatively be represented or expressed in equivalent form using a different aberration mode decomposition. For example, the first phase aberration may be represented or expressed using deformable mirror modes, Walsh modes, polar Walsh modes, Fourier modes etc. It is not essential to represent the first phase aberration using a Zernike polynomial.

Step 204 of the method 200 comprises obtaining a second image in which the adaptive optical element is configured to introduce a second phase aberration. The second phase aberration is different from the first phase aberration. In the embodiment shown, the second phase aberration is or comprises an aberration having opposite polarity or amplitude to the first phase aberration. Alternatively, the second phase aberration may be zero, or may be a different aberration mode to the first phase aberration mode. The second phase aberration may also be referred to as a second bias phase aberration. Similar to the first phase aberration, the second phase aberration need not be expressed using a Zernike polynomial.

Step 206 of the method 200 comprises applying a transform to each of the first image and the second image to produce a transformed first image and a transformed second image. Step 208 of the method 200 comprises obtaining a ratio comprising the transformed first image and the transformed second image and determining a pseudo-PSF from the ratio.

TABLE 1

Aberration modes and respective Noll indexes j up to j = 13

| n, l | Noll index j | Aberration mode |
|---|---|---|
| 0, 0 | 1 | Piston |
| 1, 1 | 2 | x-Tip |
| 1, −1 | 3 | y-Tilt |
| 2, 0 | 4 | Defocus |
| 2, −2 | 5 | Oblique astigmatism |
| 2, 2 | 6 | Vertical astigmatism |
| 3, −1 | 7 | Vertical coma |
| 3, 1 | 8 | Horizontal coma |
| 3, −3 | 9 | Vertical trefoil |
| 3, 3 | 10 | Oblique trefoil |
| 4, 0 | 11 | Primary spherical |
| 4, 2 | 12 | Vertical secondary astigmatism |
| 4, −2 | 13 | Oblique secondary astigmatism |

In the example described below, the transform is a Fourier transform. Alternatively, any transform having the property that a convolution in the image domain is transformed to a multiplication in the transformed domain may be used instead, for example a Fourier sine transform, a Fourier cosine transform, a wavelet transform etc. That property permits the sample structure function to be cancelled out in the calculation of the ratio of the transformed images.

Image formation can be mathematically expressed as a convolution between a structure of the object or sample being imaged, and the point spread function (PSF) of the imaging system (for example, microscope). By calculating the ratio of the two transformed images, the effects of the unknown sample structure are effectively removed and only PSF information is retained. That is demonstrated below using the example of a Fourier transform.

$$\text{Image}_1 = \text{Sample} * PSF_1 + \text{Noise}_1 \quad (1)$$

$$\text{Image}_1 = \text{Sample} * PSF_2 + \text{Noise}_2 \quad (2)$$

From that, a pseudo-PSF can be defined as $$\text{pseudo } PSF = FT^{-1}\left[\frac{(\text{Image}_1)}{(\text{Image}_2)}\right] = FT^{-1}\left[\frac{FT(\text{Sample} * PSF_1 + \text{Noise}_1)}{FT(\text{Sample} * PSF_2 + \text{Noise}_2)}\right] \quad (3)$$

$$= FT^{-1}\left[\frac{FT(\text{Sample}) \times FT(PSF_1) + FT(\text{Noise}_1)}{FT(\text{Sample}) \times FT(PSF_2) + FT(\text{Noise}_2)}\right] \quad (4)$$

where * represents a convolution operation and × represents a multiplication operation.

For low noise levels, where the noise terms in Equations 1 and 2 can be considered small, the following can be defined:

$$\text{pseudo } PSF = FT^{-1}\left[\frac{FT(\text{Sample})\times FT(PSF_1)+FT(\text{Noise}_1)}{FT(\text{Sample})\times FT(PSF_2)+FT(\text{Noise}_2)}\right]\approx FT^{-1}\left[\frac{FT(PSF_1)}{FT(PSF_2)}\right] \quad (5)$$

where FT represents a Fourier transform and $FT^{-1}$ represents an inverse Fourier transform. It can be seen the sample structure is removed from the calculation. Given it is possible the denominator of the ratio in Equation 5 could contain zero or near-zero values, it may be advantageous to define $$\text{pseudo } PSF = FT^{-1}\left[\frac{FT(\text{Image}_1)}{FT(\text{Image}_2)+\epsilon}\right] \quad (6)$$

where $\epsilon$ is a suitable chosen small number, although that is not essential. In addition, it is not essential to perform an inverse transform, as explained further below.

Step 210 of the method 200 comprises providing data sampled from the pseudo-PSF to a machine learning algorithm that has been trained to determine an output indicative of aberration coefficients from the data. The machine learning algorithm may be trained to determine aberration coefficients directly. The method 200 may further comprise controlling the adaptive optical element to compensate or correct aberrations inherent to the optical system, based on the determined aberration coefficients. Alternatively, the machine learning algorithm may be trained to directly determine control signals for controlling the adaptive optical element of the optical system to compensate or correct aberrations inherent to the optical system.

The method 200 may be repeated (for example, at least once) to iteratively improve a compensation or correction of aberrations inherent to the optical system.

Performing an inverse transform at step 208 may be beneficial in order to enable real number inputs into the machine learning algorithm. For example, most current open-source neural network packages such as Tensorflow and Pytorch only allow real number inputs for neural network computation. Without the inverse transform, complex numbers are required to encode all the PSF information. Alternative approaches could be to use only real or imaginary parts of the complex valued function resulting from the ratio of the transformed images, or its magnitude or phase.

Another advantage of performing the inverse transform at step 208 is most information relating to PSFs is concentrated close to the central region of PSF images (formed by performing the inverse transform). The pixels nearer to the zero spatial frequency element/pixel contain information about lower order aberrations having the slowest spatial variations in phase. In many optical systems, lower order aberrations dominate, meaning the correction of a few low order modes often provides the majority of the correction. The number of pixels needed for the computation of aberration coefficients may therefore be reduced by using only a subset of pixels of a pseudo-PSF image, for example from the central region of the pseudo-PSF image.

In the embodiment shown, data sampled from a single pseudo-PSF derived from two images is provided to the machine learning algorithm. For example, the two images may be obtained using positive and negative amplitudes of a single aberration mode, such as astigmatism.

Alternatively, two pseudo-PSFs may be derived from the same two images, the first pseudo-PSF calculated using the ratio of the transformed first image to the transformed second image, and the second pseudo-PSF calculated using the ratio of the transformed second image to the transformed first image. It is possible the two pseudo-PSFs may contain the same information. However, in the case where one image is significantly dimmer than the other image, if the dimmer image is used on top of the ratio, the calculated pseudo-PSF will be dim. That may affect the sensitivity of the machine learning algorithm. By calculating two pseudo-PSFs from the same pair of images, at least one of the pseudo-PSFs may have sufficient brightness.

In other examples, a set of pseudo-PSFs may be derived from M images comprising a plurality of pairs of images. For example, a plurality of pairs of images may be obtained, each pair of images comprising a first image in which the adaptive optical element is configured to introduce a first phase aberration and a second image in which the adaptive optical element is configured to introduce a second phase aberration different from the first phase aberration. At least one pseudo-PSF may be derived from each pair of images, as described above. In an embodiment, each pair of images may comprise images obtained with a positive and a negative amount of a respective aberration mode, for example astigmatism, coma, spherical etc. However, that is not essential, and any suitable pair of images may be used, as long as the second phase aberration of the second image is different from the first phase aberration of the first image in each pair.

The images may be paired in any suitable arrangement and used to calculate pseudo-PSFs to be provided to the machine learning algorithm. As long as the arrangement is pre-determined, the machine learning algorithm should be trained and perform in a substantially similar manner, irrespective of the first and second phase aberrations applied to the images used to calculate the pseudo-PSFs and number of pseudo-PSFs input to the machine learning algorithm.

In some examples, one or more first images may be obtained in which the adaptive optical element is configured to introduce a plurality of first phase aberrations, at least one first phase aberration comprising at least one non-zero Zernike polynomial coefficient with a Noll index greater than 4, and one or more second images may be obtained in which the adaptive optical element is configured to introduce a plurality of second phase aberrations different from the plurality of first phase aberrations.

The adaptive optical element may be configured to generate a plurality of focal spots. Instead of introducing relatively smooth phase modulations such as in the form of Zernike modes, the phase modulations provided by the adaptive optical element generating a plurality of focal spots may be more complex (for example, similar to a diffractive optical element), for example encoding multiple phase aberrations simultaneously. For example, an adaptive optical element with a large number of pixels may be used to create a holographic pattern (in effect, a deformed diffraction grating) that creates multiple focal spots in the far field. The focal spots may be designed to contain bias aberrations. A common method for generating a plurality of focal spots is to display a diffractive pattern (for example, a hologram) on an adaptive optical element (such as a spatial light modulator) using phase and/or amplitude modulation, as shown in FIG. 3A. The diffractive pattern or hologram displayed on the adaptive element may create an array of spots in the focal plane. The design of the diffractive pattern or hologram may enable significant variety in and control over the form of the focal spot array. The diffractive pattern or hologram may be generated by techniques such as the Gerchberg-Saxton algorithm, ORA, direct binary search or multiplexing Fresnel lenses.

The plurality of focal spots may comprise a 2D or a 3D arrangement or pattern of focal spots. The plurality of focal spots in the arrangement may introduce a plurality of different phase aberrations, for example each focal spot in the arrangement may introduce a different phase aberration. In an embodiment, a 2D focal spot pattern may comprise 2 focal spots, one focal spot having +1 radian of astigmatism and the other focal spot having −1 radian of astigmatism. However, any suitable aberration mode or combination of aberration modes may alternatively be used for each of the focal spots in the focal spot arrangement, for example coma, trefoil, spherical etc. At least one of the focal spots in the focal spot arrangement used to obtain the first image may introduce a first phase aberration comprising at least one non-zero Zernike polynomial coefficient with a Noll index greater than 4, but that is not essential.

A different focal spot pattern may be generated by the adaptive optical element for the first image and the second image, to ensure the plurality of first phase aberrations in the first image is different from the plurality of second phase aberrations in the second. For example, the focal spot pattern used to obtain the first image having a plurality of first aberrations may be spatially inverted to obtain the second image having a plurality of second phase aberrations different from the plurality of first phase aberrations.

The phase modulation to be provided by the adaptive optical element in order to generate an arrangement of focal spots introducing a plurality of different phase aberrations may be computed by an appropriate algorithm (for example, based on the Gerchberg-Saxton algorithms) from the desired arrangement or pattern of focal spots. In this way, the phase modulation of the adaptive optical element may encode a plurality of phase aberrations simultaneously.

Alternatively, one, some or all of the plurality of focal spots generated by the adaptive optical element to obtain the first image and the second image may be aberration-free. The different focal spot arrangement or pattern generated for the first image and the second image alone may be used to correct aberrations in the optical system. For example, at steps 202 and 204 of the method 200 described above, two images with different aberration-free focal spot arrangements may be obtained instead of two images with different first and second phase aberrations. The remaining steps of the method 200 may be performed as described above. Obtaining first and second images without deliberately introducing phase aberrations may provide a simpler alternative approach to determining aberration in an optical system comprising an adaptive optical element.

The spacing between each of the focal spots in the respective focal spot patterns may need to be closely spaced, for example spaced apart from one another at a distance of the same order as the focal spot width.

In some examples, a plurality of first images may be obtained simultaneously, and/or a plurality of second images may be obtained simultaneously. The plurality of first images may be obtained simultaneously using a plurality of detectors (for example, photodetectors) located at different spatial locations or positions. For example, the plurality of detectors may be located at different lateral X-Y positions, and/or at different Z positions or focal planes.

Figure 4:
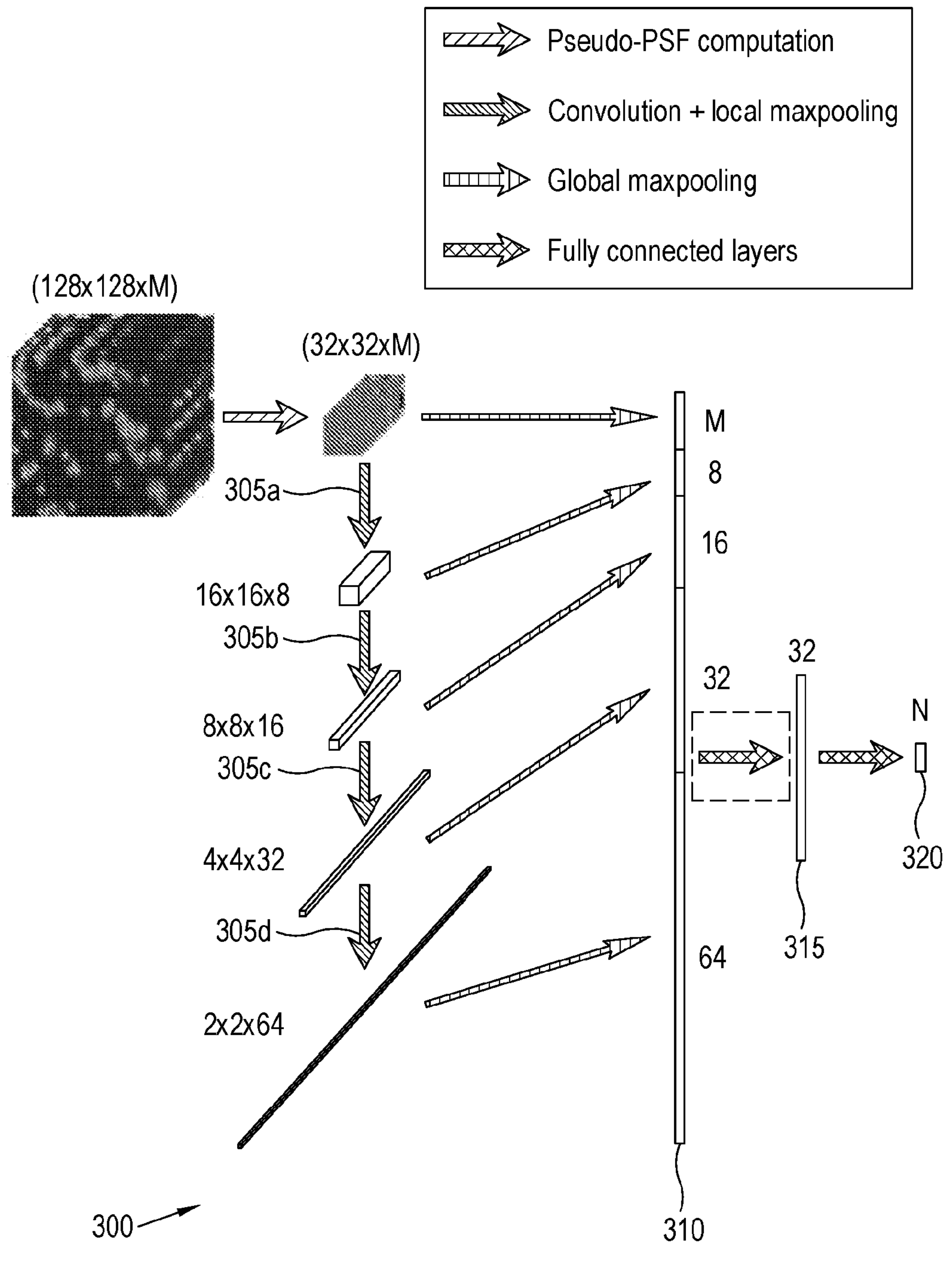
FIG. 4 shows a machine learning algorithm for use in the method shown in FIG. 3 comprising a series of convolution layers each connected to a pooling operation, the output of each pooling operation provided to a fully connected layer, in accordance with an embodiment of the invention.

FIG. 4 shows an embodiment of a machine learning algorithm 300 that may be used in the method 200 described above.

In the embodiment shown, the machine learning algorithm 300 is a convolutional neural network (CNN) comprising a series of convolution layers 305.

M pseudo-PSFs are derived or calculated from a series of M images substantially as described above, although it will be appreciated the number of pseudo-PSFs may be less than M (for example, if only one pseudo-PSF is calculated for each pair of images in the M images). In the embodiment shown, each of the M images has a size of 128×128 pixels, but any size image may be used. The pseudo-PSFs are input to the network 300 as pseudo-PSF images in the embodiment shown, although as described above that is not essential. The central 32×32 pixels of each pseudo-PSF image is cropped and provided to the network 300, although any suitable region of the pseudo-PSF image may be used instead (for example, the central 64×64 pixels, or the central 16×16 pixels).

A global maxpooling operation is performed on the pseudo-PSF images. The global maxpooling operation reduces each of the pseudo-PSF images to a single value, although that is not essential. The single values output from the global maxpooling operation on each of the pseudo-PSF images are arranged as a 1D vector and provided to a first fully connected layer 310, without being presented to a convolution layer 305.

The pseudo-PSF images are also provided to a first convolution layer 305*a*. In the embodiment shown, the first convolution layer 305*a* comprises 8 filters, although a different number of filters may alternatively be used. Each kernel has a size of 3×3 and a stride of 1, although that is not essential. Each kernel is initialized using a Glorot Uniform initializer, although a different kernel initializer such as Random Normal, Random Uniform, Glorot Uniform, He Normal, He Uniform etc. may alternatively be used. A tan h activation function is also provided for each kernel, although that is not essential, and a different activation function such as the sigmoid function, exponential function, ReLu etc. may alternatively be used. An L1L2 kernel regularizer is also provided for each kernel, although a different regularizer such as L1, L2, dropout etc. may alternatively be used.

Following convolution of the filters or kernels of the convolution layer 305*a* with the pseudo-PSF images to form a stack of 8 feature maps, a first local maxpooling operation is performed to reduce dimensionality of the feature maps. The reduced dimension feature maps are then passed to a second convolution layer 305*b* (discussed further below). In the embodiment shown, the first local maxpooling operation uses a kernel of size 2×2 and a stride of 2, although that is not essential. In the embodiment shown, each pseudo-PSF image is zero-padded to ensure the output of the convolution operation for each filter produces a feature map having the same dimensions (32×32 pixels) as the input pseudo-PSF image. That enables the first local maxpooling operation, using a 2×2 kernel with stride 2, to reduce the dimensions of the feature maps to 16×16 pixels. However, it will be appreciated that zero-padding is not essential, and alternative paddings such as reflect-padding or symmetric-padding may be used instead, or no padding may be used. A local maxpooling operation may be performed on a feature map having any dimensions resulting from a convolution operation.

In addition, following convolution of the filters or kernels of the convolution layer 305*a* with the pseudo-PSF images, a global maxpooling operation is performed on each of the feature maps, as described above. The single values output from the global maxpooling operation on the feature maps (8 values in the embodiment shown) are arranged as a 1D vector and provided to the first fully connected layer 310, without being provided to a subsequent convolution layer 305. The output from the global maxpooling operation following the convolution layer 305*a* is concatenated with the output from the global maxpooling operation performed on the pseudo-PSF images, such that the concatenated results also form a 1D vector.

The reduced dimension feature maps output from the first local maxpooling operation are provided to the second convolution layer 305*a*. The second convolution layer 305*b* is substantially similar to the first convolution layer 305*a*, but instead comprises 16 filters. However, the second convolution layer 305*b* may comprise any suitable number of filters.

Following the convolution operations of the second convolution layer 305*b*, a second local maxpooling operation is performed to reduce dimensionality of the resulting feature maps, substantially as described above. The second local maxpooling operation reduces the dimensions of the feature maps to 8×8 pixels in the embodiment shown, although that is not essential.

In addition, a global maxpooling operation is performed on each of the feature maps output from the second convolution layer 305*b*, substantially as described above. The single values output from the global maxpooling operation on the feature maps (16 values in the embodiment shown) are arranged as a 1D vector and provided to the first fully connected layer 310, without being provided to a subsequent convolution layer 305. The output from the global maxpooling operation following the second convolution layer 305*b* is concatenated with the existing values in the first fully connected layer 310.

The reduced dimension feature maps output from the second local maxpooling operation are provided to a third convolution layer 305*c*. The second convolution layer 305*b* is substantially similar to the preceding convolution layers 305*a*, 305*b*, but instead comprises 32 filters. However, the third convolution layer 305*c* may comprise any suitable number of filters.

Following the convolution operations of the third convolution layer 305*c*, a third local maxpooling operation is performed to reduce dimensionality of the resulting feature maps, substantially as described above. The third local maxpooling operation reduces the dimensions of the feature maps to 4×4 pixels, although that is not essential.

In addition, a global maxpooling operation is performed on each of the feature maps output from the third convolution layer 305*c*, substantially as described above. The single values output from the global maxpooling operation on the feature maps (32 values in the embodiment shown) are arranged as a 1D vector and provided to the first fully connected layer 310, without being provided to a subsequent convolution layer 305. The output from the global maxpooling operation following the third convolution layer 305*c* is concatenated with the existing values in the first fully connected layer 310.

The reduced dimension feature maps output from the third local maxpooling operation are provided to a fourth convolution layer 305*d*. The fourth convolution layer 305*d* is substantially similar to the preceding convolution layers 305*a*, 305*b*, 305*c* but instead comprises 64 filters. However, the fourth convolution layer 305*d* may comprise any suitable number of filters.

Following the convolution operations of the fourth convolution layer 305*d*, a fourth local maxpooling operation is performed to reduce dimensionality of the resulting feature maps, substantially as described above. The fourth local maxpooling operation reduces the dimensions of the feature maps to 2×2 pixels, although that is not essential.

In addition, a global maxpooling operation is performed on each of the feature maps output from the fourth convolution layer 305*d*, substantially as described above. The single values output from the global maxpooling operation on the feature maps (64 values in the embodiment shown) are arranged as a 1D vector and provided to the first fully connected layer 310. The output from the global maxpooling operation following the fourth convolution layer 305*d* is concatenated with the existing values in the first fully connected layer 310.

In the embodiment shown, four convolution layers 305*a*-305*d* are provided, but the network 300 may comprise any suitable number of convolution layers 305. The number of convolution layers 305 may be selected on a size of the pseudo-PSF images provided to the network, to ensure the network is processing and extracting information from the input data sufficiently. For example, if a central region of each pseudo-PSF image larger than 32×32 pixels is used (such as 64×64 pixels), a greater number of convolution layers 305 (for example, five convolution layers) may be provided. Alternatively, if a central region of each pseudo-PSF image smaller than 32×32 pixels is used (such as 16×16 pixels), a smaller number of convolution layers 305 (for example, three convolution layers) may be provided.

The first fully connected layer 310 comprises N neurons, where N is equal to the number of single values provided to the first fully connected layer 310 from the pseudo-PSF images and the feature maps from the local maxpooling operating following each convolution layer 305*a*-305*d*.

The first fully connected layer 310 is connected to a second fully connected layer 315. The second fully connected layer 315 has fewer neurons than the first fully connected layer 310. In the embodiment shown, the second fully connected layer 315 comprises 32 neurons, although any suitable number of neurons may be provided. The second fully connected layer 315 is connected to an output layer 320. The number of neurons of the output layer 320 corresponds to the number of aberration modes for which the network 300 will be trained to determine an output indicative of aberration coefficients. In the embodiment shown, the output layer 320 comprises 5 neurons, corresponding to 5 aberration modes (for example Zernike modes, deformable mirror modes, Walsh modes, polar Walsh modes, Fourier modes etc.). However, it will be appreciated the output layer 320 may comprise any suitable number of neurons, N, each corresponding to a different aberration mode to be determined by the network 300.

It will also be appreciated the aberration mode decomposition of the output layer 320 need not be the same aberration mode decomposition of the first and second phase aberrations introduced in the first and second images in the method 200 as described above. As described above, the first and second phase aberrations introduced in the first and second images may be represented using any suitable representation or decomposition, for example Zernike modes, Walsh modes, polar Walsh modes, deformable mirror modes, Fourier modes etc. The aberration modes of the output layer 320 may equally be represented using any suitable representation or decomposition, that may be the same or different from the representation of the first and second phase aberrations introduced in the first and second images.

The activation function for the first and second fully connected layers 310, 315 is the tan h function in the embodiment shown, although different activation functions may alternatively be used for each layer 310, 315. The initializer for the first fully connected layer 310 is Glorot Uniform, while the initializer for the second fully connected layer 315 is Zeros. However, it will be appreciated different initializers may alternatively be used for each layer 310, 315. An L1L2 regularizer is provided for the first fully connected layer 310, while no regularizer is provided for the second fully connected layer 315, although different regularizers may alternatively be used.

The global maxpooling operation performed after each convolution layer 305 and provided to the first fully connected layer 310 may enable the network 300 to converge the to a suitable level of complexity and avoid overfitting. In addition, following training, the network weights may be extracted to provide valuable insight into the way the information is processed by the network 300, such as whether aberration effects on the smaller or larger scale features contain more important information. For example, if larger weight values for the first fully connected layer 310 are concentrated at the inputs taken from later convolution layers in the series of convolution layers 305 of the network 300, it may be determined that coarser scale image features carry more important information relating to the aberrations.

In addition, the network 300 may be smaller, with fewer trainable kernels and/or nodes, than conventional networks used to compute phase aberrations from images (for example, microscope images). That may increase ease of network convergence and reduce computational requirements for both training and operation.

Alternatively, the machine learning algorithm may have a different architecture to the network 300 described above. For example, the machine learning algorithm may have a conventional CNN architecture or be a fully connected neural network. If a fully connected neural network is used, it may be necessary to flatten the input pseudo-PSF before providing it to the network.

As described above with respect to the method 200 and the network 300, one or more pseudo-PSFs are derived from M images comprising at least one pair of images. The network is configured to determine, from the pseudo-PSFs, an output indicative of aberration coefficients for N different aberration modes.

Using the determined output indicative of the aberration coefficients, deconvolution may be carried out on the obtained images. The deconvolution process comprises deconvolving the images with a PSF representative of the imaging system, resulting in improved images of the sample structure of interest. If the aberration in the system is known, for example based on the determined output indicative of the aberration coefficients, deconvolution can be carried out.

The first and second images can be deconvolved with the pseudo-PSF(s) determined from the ratio of the transformed first and second images (the pseudo-PSF(s) containing the aberrations of the imaging system), in combination with the determined output indicative of the aberration coefficients. Alternatively, the adaptive optical element may be controlled based on the determined output indicative of the aberration coefficients to compensate or correct aberrations in the imaging system. After controlling the adaptive optical element, new first and second images may be obtained, and the new first and second images may be deconvolved with a new pseudo-PDF(s) determined from a ratio of transformed new first and second images. In other examples, a combination of aberration correction (by controlling the adaptive optical element) and deconvolution based on the determined output indicative of the aberration coefficients may be used.

The following examples relate to one or more networks 300 trained and tested with the following:

Example A) M=2, N=5;

Example B) M=2, N=9

Example C) M=10, N=5

Example D) M=18, N=9.

For examples with N=5 (Examples A, C), outputs indicative of aberration coefficients for the following 5 aberration modes are determined by the networks 300—oblique astigmatism, vertical astigmatism, vertical coma, horizontal coma and spherical.

For examples with N=9 (Examples B, D), outputs indicative of aberration coefficients for the following 9 aberration modes are determined by the networks 300—oblique astigmatism, vertical astigmatism, vertical coma, horizontal coma, vertical trefoil, oblique trefoil, spherical, oblique secondary astigmatism and vertical secondary astigmatism.

Figure 5:
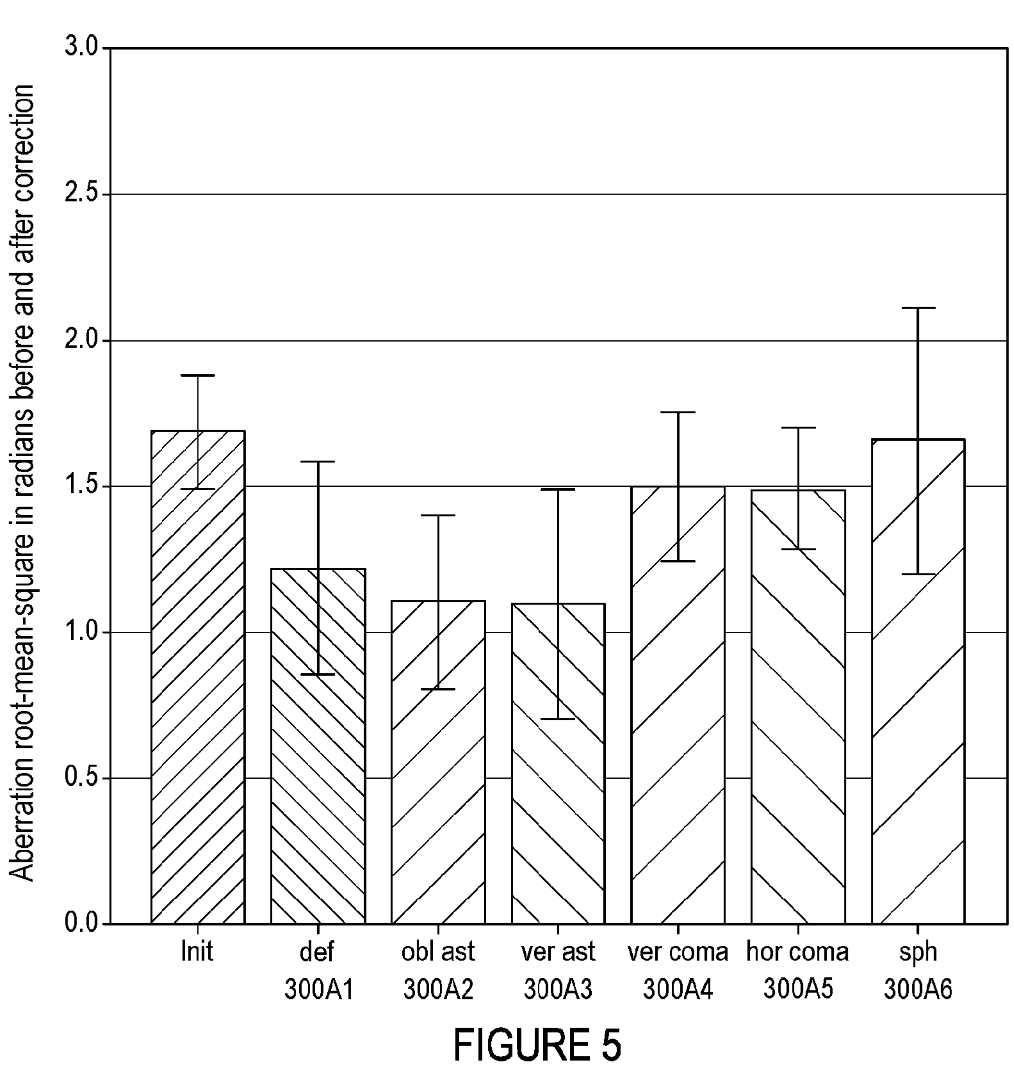
FIG. 5 shows a plot of aberration root-mean-square in radians, both before correction and after correction using machine learning algorithms trained using different selected aberration modes in accordance with embodiments of the invention.

FIG. 5 shows a plot of experimental results obtained using a plurality of networks 300A each trained using M=2, N=5 in accordance with Example A as described above. Each network 300A was trained using pseudo-PSFs derived from a different pair of images. A different aberration mode was used for the first phase aberration of the first image of the pair of images for each respective network 300A.

In the example shown, one of the networks 300A2 was trained using pseudo-PSFs derived from a first image having a first phase aberration of +1 radian of oblique astigmatism introduced, and a second image having a second phase aberration of −1 radian oblique astigmatism introduced. The other networks 300A were similarly trained using pseudo-PSFs derived from pairs of images having first and second phase aberrations of opposing polarity for the following aberration modes respectively: defocus (300A1), vertical astigmatism (300A3), vertical coma (300A4), horizontal coma (300A5) and spherical (300A6).

Each network 300A was tested using 20 sets of microscope collected images of beads. In the example shown, each set of images comprised a pair of images, with the same randomly generated aberrations (e.g., a random combination of Zernike modes with a random amplitude in a pre-defined range) applied to each image in the pair using an adaptive optical element in the microscope. In addition to the randomly generated aberrations, a first phase aberration corresponding to a selected aberration mode was also applied to the first image in each pair, and a second phase aberration having an opposite amplitude to the first phase aberration was applied to the second image in each pair, as described above. The selected aberration mode applied to the 20 sets of images was different for different networks 300A. In the example shown, 20 sets of sample images were generated for each network 300A, using defocus as the selected aberration mode for network 300A1, oblique astigmatism as the selected aberration mode for another network 300A2, vertical astigmatism as the selected aberration mode for another network 300A3, horizontal coma as the selected aberration mode for another network 300A4, vertical coma as the selected aberration mode for another network 300A5, and spherical as the selected aberration mode for another network 300A6.

The left-most column in the plot of FIG. 5 shows the statistics for the initial randomly generated aberrations before any correction. The remaining columns in the plot of FIG. 5 show the magnitude of remaining aberrations after subtracting the estimated initial aberration determined by each respective network 300A from the initial aberration. As can be seen, the networks 300A2, 300A3 trained and tested using astigmatism (either oblique or vertical) as the selected aberration mode provides the greatest reduction in aberrations following correction.

In addition, the trained weights of the first fully connected layer 310 in each network 300A were examined. The networks 300A2, 300A3 trained using astigmatism (either oblique or vertical) as the selected aberration mode had larger weights than the networks 300A trained using other selected aberration modes as bias. The larger weights indirectly suggest the networks 300A2, 300A3 trained using astigmatism (either oblique or vertical) learned more than the networks 300A trained using a different bias aberration mode. Training the networks 300A1, 300A2 using astigmatism as the bias aberration mode may therefore provide a significant and surprising improvement in aberration correction in comparison to other bias aberration modes.

Collecting the test images using a microscope may cause the test images to be affected by a number of uncertain factors associated with real optical systems, which differ from ideal mathematical models which may be used to generate synthetic training data (see below). Such factors include non-linearity of the adaptive optical element, non-uniformly illuminated back pupil of the object lens, noise introduced by the PMT, three-dimensional structure of the imaged sample. Testing the networks 300 using microscope collected test data may allow assessment of how robustly the trained networks 300 are able to cope with such uncertainties in real optical systems.

Another network 300B was trained and tested using M=2, N=9 in accordance with Example B. The network 300B was trained using pseudo-PSFs derived from a first image having a first phase aberration of +1 radian of oblique astigmatism introduced, and a second image having a second phase aberration of −1 radian oblique astigmatism introduced.

A further network 300C was trained using M=10, N=5 in accordance with Example C. The network 300C was trained using pseudo-PSFs derived from 5 pairs of images. Each respective pair of images comprised first and second images having first and second phase aberrations of opposing polarity for a different one of the 5 aberration modes for which the network 300C was configured to determine an output indicative of.

A further network 300D was trained using M=18, N=9 in accordance with Example D. The network 300D was trained using pseudo-PSFs derived from 9 pairs of images. Each respective pair of images comprised first and second images having first and second phase aberrations of opposing polarity for a different one of the 9 aberration modes for which the network 300D was configured to determine an output indicative of.

Figure 6A:
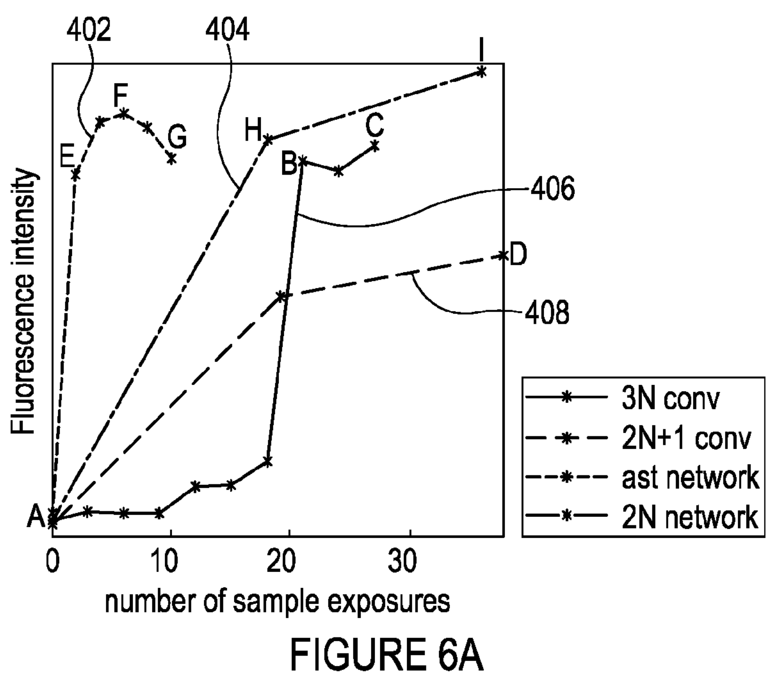
FIG. 6A shows a plot of typical experimental results for fluorescence intensity as a function of the number of sample exposures for embodiments of the method shown in FIG. 3 compared to conventional parabolic fitting algorithms.

FIG. 6A shows typical experimental results for fluorescence intensity as a function of the number of sample exposures for the following: a network 300A or 300B as described above, trained and tested using pseudo-PSFs derived from first and second images having opposing polarities of astigmatism introduced and configured to determine an output indicative of aberration coefficients for N different aberration modes (line 402, blue); a network 300C or 300D as described above, trained and tested using M=2N pairs of images (line 404, grey); a conventional parabolic fitting algorithm based on 3N measurements (line 406, red) as described above with respect to FIGS. 1 and 2; and a conventional parabolic fitting algorithm based on 2N+1 measurements (line 408, green) as described above with respect to FIGS. 1 and 2.

FIG. 6A provides an illustrative comparison of networks 300 having the same N, for example, the network 300A M=2, N=5 and the network 300C M=10, N=5, or the network 300B M=2, N=9 and the network 300D M=18, N=9. As can be seen, networks 300 having M=2 correct aberrations faster than other approaches—the plot of fluorescence intensity as a function of number of sample exposures has a sharper gradient and requires fewer exposures to provide a similar correction to networks 300 having M=2N. However, the network 300 having M=2N is less susceptible to noise, and may be preferable when the aberration is small (as can be seen, the line 402 does not converge to a higher maximal fluorescence intensity as the number of sample exposures increases). It is clear both M=2 and M=2N networks 300 outperform conventional aberration determination and correction approaches such as parabolic fitting algorithms, as shown in FIG. 6A.

Figure 6B:
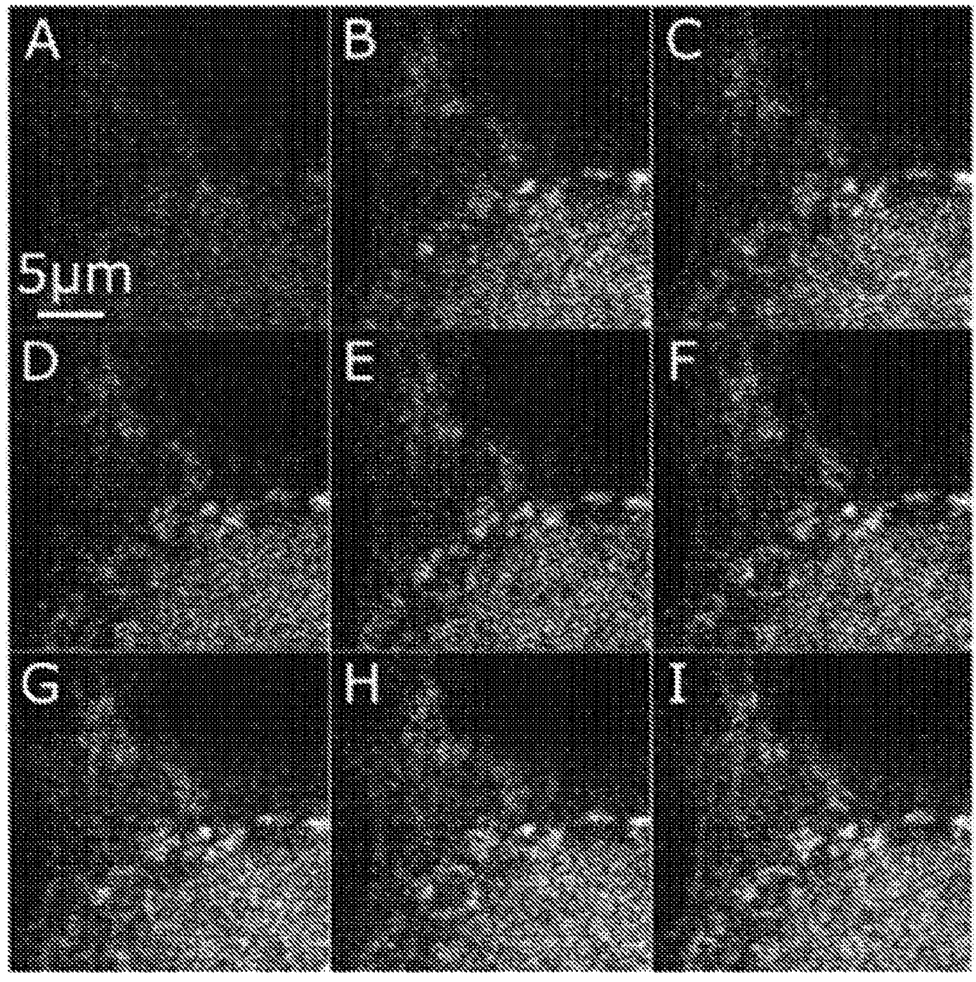
FIG. 6B shows a number of images A-I each corresponding to a point on the plot shown in FIG. 6A.

FIG. 6B shows a number of images A-I each corresponding to a point on the plot shown in FIG. 6A. Image A is the image collected without applying any bias aberration using adaptive optics. Images B and C show aberration corrected images using a parabolic fitting algorithm based on 3N measurements. Image D shows an aberration corrected image using a parabolic fitting algorithm based on 2N+1 measurements. Images E, F and G show aberration corrected images using 5 iterations of the method 200 as described above, with the network 300 trained using M=2 and using astigmatism for the first and second phase aberrations of the first and second images. Images H and I show aberration corrected images using 2 iterations of the method 200 as described above, with the network 300 trained using M=18 and using a plurality of pairs of images with different aberrations introduced for each pair of images. Images E to I demonstrate the improvement in aberration determination and correction enabled by the present invention.

Training data for each of the networks 300 described above may be generated, for example, in the following manner.

Images of biological samples are obtained from microscopes, and optionally down-sampled (for example, with a sampling rate greater than the Nyquist rate). The images are used to form a bank of typical "sample structure" images.

Optionally, the "sample structure" images may be augmented. For example, a random part from each of one or more images is cropped out. That cropped part is then randomly rotated and/or flipped. Additionally or alternatively, random shapes such as circles, squares, lines, dots etc. may be randomly added to the cropped part. The cropped and augmented part is then used as the sample structure image.

The image formation process of a microscope is simulated using the Fourier optics theorem to mathematically model a microscope. A programme modelling the microscope generates a random point spread function from a random pupil phase wavefront using the Fourier optics theorem. The random pupil phase wavefront is generated as a random combination of chosen aberration modes (e.g., Zernike modes, Walsh modes, Polar Walsh modes, deformable mirror modes, Fourier modes), with a random amplitude in a pre-defined range, that the network 300 is configured to provide an output for. The random distribution may follow a uniform distribution over a hyper-dimensional sphere. A small confusion magnitude may also be added to make the random pupil phase wavefront label less accurate (which in turn may help to improve robustness of the trained network 300). On top of the random pupil phase wavefront, the selected bias phase aberration is also added.

The random point spread function is then convolved with the "sample structure" to form "clean" images. Random Poisson distributed noise with a random chosen mean may be added to the "clean" images to form "noisy" images. The formed images coupled with the random pupil phase wavefront labels form the training dataset used to train the networks 300.

Figure 7:
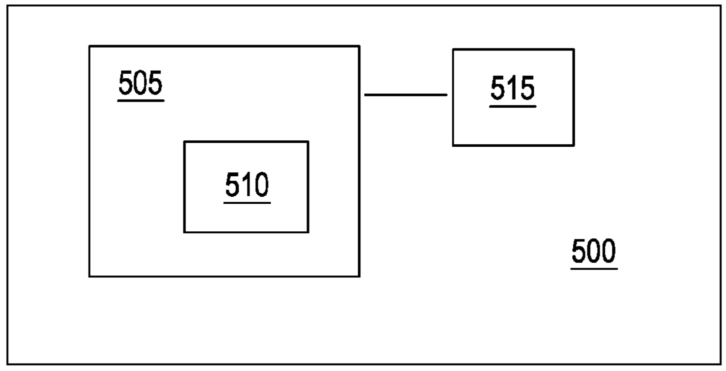
FIG. 7 shows a system comprising an optical system comprising an adaptive optical element and a processor configured to perform the method shown in FIG. 3.

FIG. 7 shows a system 500. The system 500 comprises an optical system 505 comprising an adaptive optical element 510. The system 500 further comprises a processor 515 operably connected to the optical system 505. The processor 515 is configured to control the optical system 505 to obtain images in which the adaptive optical element 510 is configured to introduce phase aberrations. The processor 515 may be configured to cause the optical system 505 to perform the method 200 described above.

From reading the present disclosure, other variations and modifications will be apparent to the skilled person. Such variations and modifications may involve equivalent and other features which are already known in the art of adaptive optics, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the term "a" or "an" does not exclude a plurality, a single processor or other unit may fulfil the functions of several means recited in the claims and any reference signs in the claims shall not be construed as limiting the scope of the claims.

The invention claimed is:

1. A method of determining aberration in an optical system, the optical system comprising an adaptive optical element, the method comprising:

a) obtaining a first image in which the adaptive optical element is in a first configuration;

b) obtaining a second image in which the adaptive optical element is in a second configuration, wherein the second configuration is different from the first configuration;

c) applying a transform to the first image and the second image to produce a transformed first image and a transformed second image;

d) obtaining a ratio comprising the transformed first image and the transformed second image and determining a pseudo-point spread function (pseudo-PSF) from the ratio; and e) providing data sampled from the pseudo-PSF to a machine learning algorithm that has been trained to determine an output indicative of aberration coefficients from the data.

2. The method of claim 1, wherein:

in the first configuration the adaptive optical element is configured to introduce a first phase aberration comprising at least one non-zero Zernike polynomial coefficient with a Noll index greater than 4; and in the second configuration the adaptive optical element is configured to introduce a second phase aberration, wherein the second phase aberration is different from the first phase aberration.

3. The method of claim 2, wherein:

i) the first phase aberration is or comprises astigmatism; and/or ii) the second phase aberration is zero; or iii) the second phase aberration is an aberration having opposite polarity or amplitude to the first phase aberration.

4. The method of claim 2, wherein:

obtaining the first image comprises obtaining a plurality of first images in each of which the adaptive optical element is configured to introduce a different first phase aberration comprising at least one non-zero Zernike polynomial coefficient with a Noll index greater than 4; and obtaining the second image comprises obtaining a plurality of second images.

5. The method of claim 2, wherein:

obtaining the first image comprises obtaining a first image in which the adaptive optical element is configured to introduce a plurality of first phase aberrations, at least one of the first phase aberrations comprising at least one non-zero Zernike polynomial coefficient with a Noll index greater than 4; and obtaining the second image comprises obtaining a second image in which the adaptive optical element is configured to introduce a plurality of second phase aberrations different from the plurality of first phase aberrations.

6. The method of claim 1, wherein determining the pseudo-PSF comprises applying the inverse of the transform to determine a pseudo-PSF image from the ratio.

7. The method of claim 1, wherein the transform comprises the property that a convolution in the image domain is transformed to a multiplication in the transformed domain.

8. The method of claim 7, wherein the transform is one of a Fourier transform, a Fourier cosine transform, a Fourier sine transform or a wavelet transform.

9. The method of claim 1, wherein:

obtaining the ratio comprises obtaining a first ratio of the transformed first image to the transformed second image and obtaining a second ratio of the transformed second image to the transformed first image; and determining the pseudo-PSF comprises determining a first pseudo-PSF from the first ratio and determining a second pseudo-PSF from the second ratio.

10. The method of claim 1, wherein:

in the first configuration the adaptive optical element is configured to generate a first plurality of focal spots having a first arrangement; and in the second configuration the adaptive optical element is configured to generate a second plurality of focal spots having a second arrangement, wherein the second arrangement of focal spots is different from the first arrangement of focal spots.

11. The method of claim 10, wherein the focal spots are spaced apart from one another by a distance of the order of a width of the focal spots.

12. The method of claim 10, wherein at least one of the focal spots introduces a phase aberration, and optionally wherein each of a plurality of the focal spots introduce a different phase aberration.

13. The method of claim 1, wherein:

obtaining the first image comprises obtaining a plurality of first images simultaneously; and obtaining the second image comprises obtaining a plurality of second images simultaneously.

14. The method of claim 13, wherein:

obtaining the plurality of first images simultaneously and obtaining the plurality of second images simultaneously comprises using a plurality of detectors located at different spatial locations or positions, optionally located at different lateral X-Y positions and/or at different Z positions or focal planes.

15. The method of claim 1, further comprising controlling the adaptive optical element based on the output from the machine learning algorithm to compensate or correct aberration in the optical system.

16. The method of claim 15, further comprising repeating steps a) to e) after controlling the adaptive optical element to compensate or correct aberration in the optical system.

17. The method of claim 1, wherein the machine learning algorithm comprises a series of convolution layers, each connected to a pooling operation.

18. The method of claim 17, wherein an output of each of the pooling operations is provided to a fully connected layer.

19. A system comprising:

an optical system comprising an adaptive optical element; and a processor operably connected to the optical system and configured to perform a method comprising the following steps:

a) obtaining a first image in which the adaptive optical element is in a first configuration;

b) obtaining a second image in which the adaptive optical element is in a second configuration, wherein the second configuration is different from the first configuration;

c) applying a transform to the first image and the second image to produce a transformed first image and a transformed second image;

d) obtaining a ratio comprising the transformed first image and the transformed second image and determining a pseudo-point spread function (pseudo-PSF) from the ratio; and e) providing data sampled from the pseudo-PSF to a machine learning algorithm that has been trained to determine an output indicative of aberration coefficients from the data.

20. A non-transitory computer readable medium storing a computer program comprising instructions which, when the program is executed by a processor, cause the processor to carry out a method comprising the following steps:

a) obtaining a first image in which the adaptive optical element is in a first configuration;

b) obtaining a second image in which the adaptive optical element is in a second configuration, wherein the second configuration is different from the first configuration;

c) applying a transform to the first image and the second image to produce a transformed first image and a transformed second image;

d) obtaining a ratio comprising the transformed first image and the transformed second image and determining a pseudo-point spread function (pseudo-PSF) from the ratio; and e) providing data sampled from the pseudo-PSF to a machine learning algorithm that has been trained to determine an output indicative of aberration coefficients from the data.

* * * * *